US005636656A

United States Patent [19]

Hubbard

[11] Patent Number: 5,636,656

[45] Date of Patent: Jun. 10, 1997

[54] TAPPING DEVICE FOR A KEG TAP

[75] Inventor: Julian D. Hubbard, Monaco, Monaco

[73] Assignee: R.T.C. Limited, Dublin 8, Ireland

[21] Appl. No.: 351,319

[22] PCT Filed: Sep. 17, 1993

[86] PCT No.: PCT/EP93/02517

§ 371 Date: May 11, 1995

§ 102(e) Date: May 11, 1995

[87] PCT Pub. No.: WO94/07791

PCT Pub. Date: Apr. 14, 1994

[30] Foreign Application Priority Data

Sep. 25, 1992 [DE] Germany .......................... 42 32 142.5

[51] Int. Cl.[6] .......................... F16L 37/252; F16L 37/32; F16K 31/528

[52] U.S. Cl. ....................... 137/212; 137/322; 222/400.7; 251/252

[58] Field of Search .................................... 137/317, 320, 137/322, 212, 614.11; 222/400.7, 394; 251/149.1, 149.8, 149.9, 252

[56] References Cited

U.S. PATENT DOCUMENTS

| | | | |
|---|---|---|---|
| 715,622 | 12/1902 | Stretch et al. | 251/252 |
| 965,343 | 7/1910 | Strong, Sr. | 251/252 |
| 1,585,163 | 5/1926 | Milner | 251/252 |
| 2,642,256 | 6/1953 | Stehlin | 251/252 |
| 2,952,269 | 9/1960 | Stehlin | 251/252 |
| 3,494,373 | 2/1970 | Horak et al. | 137/322 |
| 3,684,240 | 8/1972 | Stehlin | 251/252 |
| 3,753,442 | 8/1973 | Tauber | 137/323 |
| 4,159,102 | 6/1979 | Fallon et al. | 137/322 |
| 4,450,853 | 5/1984 | Dessenoix et al. | 222/400.7 |
| 5,176,298 | 1/1993 | Mogler et al. | 137/322 |
| 5,244,127 | 9/1993 | Hubbard | 222/400.7 |

*Primary Examiner*—George L. Walton

*Attorney, Agent, or Firm*—Foley & Lardner

[57] ABSTRACT

The present invention concerns a tapping device for a keg tap with a holding element (17) for a socket (1) having a keg connection and therein beer pipe (2) sealed off against a pressure chamber with tap valve and tapping element (9) in which, according to the invention, the socket (1) has a spiral-shaped slot (3) with a pitch corresponding at least to the opening path of the valve opening element (9), into the socket (1), a bayonet collar can be introduced from above which has its own slot (3') which can be brought into congruence with the slot, as well as an opposite-lying guiding edge (26) of the same pitch, whereby a downwardly open entrance is associated with the guiding edge (26). Between the bayonet collar (4) and the socket (1) is movable held an inwardly hollow tapping plunger (6) with a valve opening element (9) and connected with a circumferential lifting lever (7) passing through the slot (3, 3'), lying opposite which is arranged a counter spigot (8) guided on the guiding edge (26). Into the tapping plunger (6) is pushed an immersion plunger (13), provided with O-ring (10, 11, 12), which inwardly has a pressure chamber (14) sealed off against the tapping plunger (6) and a connecting bore (15) to this. The immersion plunger (13) carries on the inside the beer pipe (2) provided with a bottom seal (16), whereby, between immersion plunger (13) and beer pipe (2), a free space is left free as pressure chamber (37). The socket (1) possesses, connecting on to the holding element (17), a collar (18) against which is sealed the tapping plunger (6) with an upper O-ring (19), whereby a transverse bore (20) runs in the tapping plunger below the O-ring.

13 Claims, 2 Drawing Sheets

TAPPING DEVICE FOR A KEG TAP

The present invention concerns a new tapping device for a keg tap this tapping device is thereby a part of a beer tap device which can be placed on a keg such as described, e.g. in European Patent 0 283 797 or in German Utility Model 91 10 371.

In the case of the prior art, the opening of the keg valve takes place with the help of a tapping element which is mechanically moved downwardly a ring nut (EP 0 283 797) or by a lever (DE-U 91 10 371). The tapping device is thereby fixed on the keg e.g. with the help of a ratchet, in the interior of the tapping element is present the beer pipe via which it passes to the spigot.

The inner pressure in the keg necessary herefor is maintained with the help of a hand pump or with the help of $CO_2$ cartridges, the present invention is suitable for both procedures.

The problem in the case of the prior art is that, on the one hand, the operating of the tapping device with the help of a screw ring is laborious and, on the other hand, a lever tilting from above downwardly presupposes a large constructional height in order that the lever does not lie on the keg rim. A further disadvantage consists in that the releasing must take place with two hands since, before the raising of the lever, a stop notch must be released.

Therefore, the present invention has set itself the task of providing a tapping device for a keg tap which permits a one-handed operation and, at the same time, only a small constructional height.

The solution of this task succeeds with a tapping device for a keg tap with a holding element for a socket having a keg connection and therein a beer pipe, sealed off against a pressure chamber, with tap valve and tapping element in which, according to the invention, the socket has a spirally-shaped slot with a pitch corresponding at least to the opening path of the valve opening element. Into the socket from above can be introduced a bayonet collar which has its own slot which can be brought into alignment with the slot, as well as an opposite-lying guiding edge of the same pitch, whereby the guiding edge is associated with a downwardly open entrance. Between the bayonet collar and the socket is movably held an interior-hollow tapping plunger with a valve-opening element and connected with a circumferential lifting lever to which is arranged lying opposite a counter spigot on the guiding edge. Into the tapping plunger is pushed an immersion plunger provided with O-rings which inside has a pressure chamber sealed off against the tapping plunger and has a connecting bore thereto. Inwardly lying, the immersion plunger carries the beer pipe provided with bottom seal, whereby, between immersion plunger and beer pipe, a free space is left free as pressure chamber. The socket possesses, connecting to the holding element, a collar against which the tapping plunger is sealed off with an upper O-ring, whereby, below the O-ring, a transverse bore runs in the tapping plunger.

With the present invention, it is possible for the first time, by a radial turning of the circumferential lever bringing about the opening of the keg, to make the connection of the beer pipe from keg to tap, whereby one turn of the lever suffices and the movement of which is limited to the working path of the tapping plunger.

The device is suitable not only for taps equipped with air pumps but also with $CO_2$ connection.

The circumferential lifting lever and the counter spigot can be held by friction against the opening pressure of the keg valve spring in the open position, i.e. on the lower end of the spiral, e.g. by altered pitch of the spiral.

Preferred, however, is a forced holding, for which purpose, in simple manner, the slots on the lower end of the spiral have upwardly domed catch recesses.

For the use of the tap with $CO_2$ connection in the form of cartridges or bottles, the device can be provided with a valve which closes the gas outlet in the case of lifting of the valve opening element. For this purpose, it is suggested to provide the tapping plunger below the transverse bore with a second O-ring sealing and to widen the collar downwardly funnel shaped, whereby this second O-ring seal, in the case of descent of the tapping plunger, reaches into the region of the widening and opens the pressure gas path and, vice versa, in the case of lifting of the plunger, lies sealingly on the collar inner wall and closes the gas path.

For the strain-free guiding of the tapping plunger, the tapping plunger can have an upper plate, preferably a double plate, the edge (edges) of which slidingly lie in the bayonet collar and guide the tapping plunger tilt-free. Furthermore, in the plate there is preferably formed the seating for the circumferential lifting lever and this has an assembly opening, accessible from above, for the introduction of a locking pin which, connects the circumferential lifting lever with the tapping plunger.

The present invention will be explained in more detail on the basis of the accompanying Figures.

Figure 1:
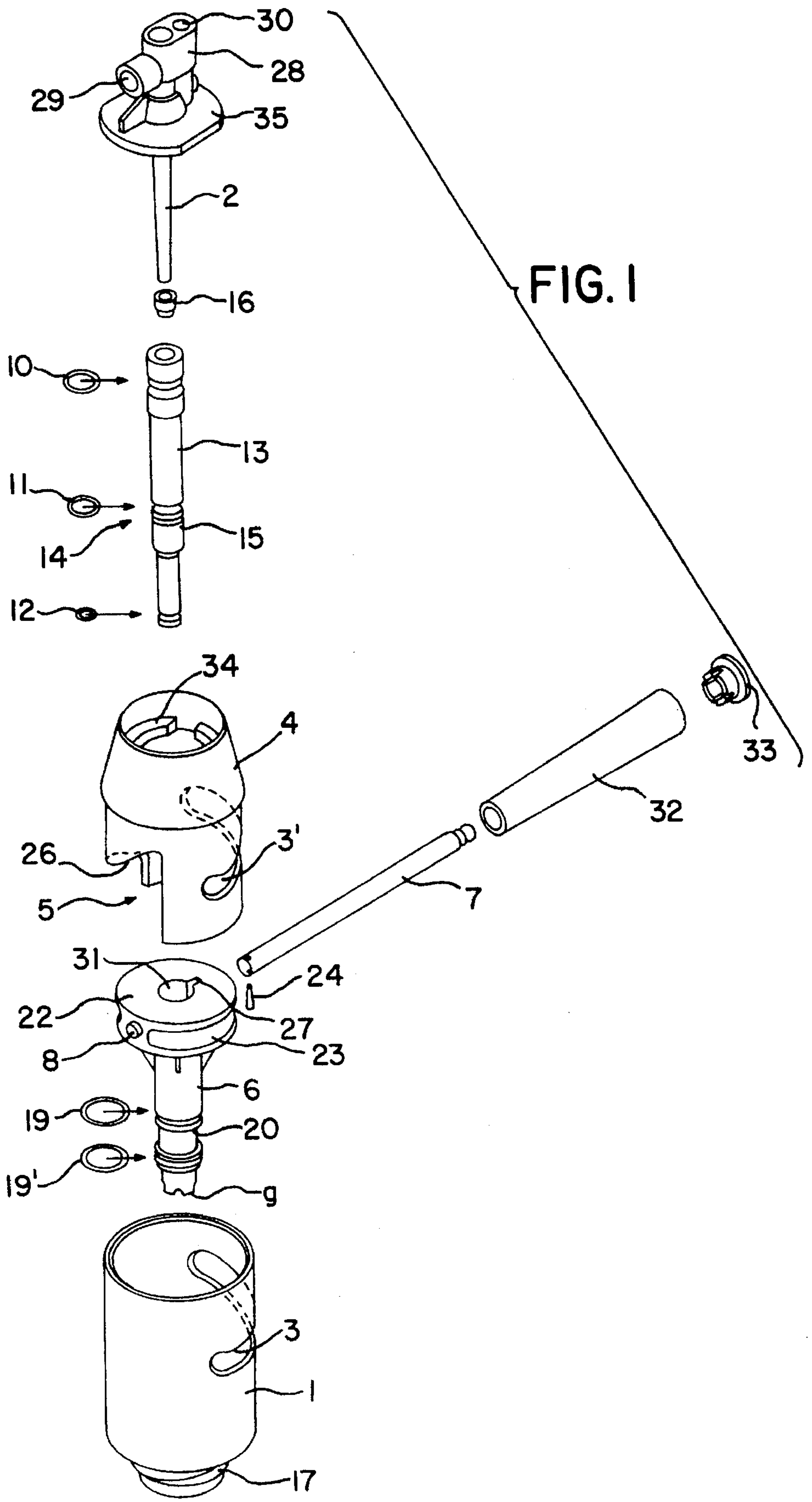
FIG. 1 shows an exploded drawing of the tapping device

In FIG. 1, the beer pipe 2 is shown with a bottom seal 16 which, on the head end, is provided with a spigot bore 29 and a pressure medium bore 30. This beer pipe is pushed into the inwardly hollow immersion plunger 13 and possesses in its inner wall a smaller dimension so that an annular space results via which the pressure medium ($CO_2$ air from a hand pump) can pass from the pressure medium bore 30 into the lower part of the immersion plunger 13 up to the bottom seal, whereby the lower end of the beer pipe 2 and the lower end of the immersion plunger—where, after assembly, the bottom seals 16 also rests—somewhat coincide.

The immersion plunger possess three O-rings 10, 11, 12, as well as, below the middle O-ring 11, a connecting bore 15 via which the pressure medium can emerge from the ring space between beer pipe 2 and immersion plunger 13.

After complete assembly, immersion plunger 13 and beer pipe 2 rest in the tapping plunger 6 and, after assembly of the remaining pans, are pushed into these from above, whereby the O-rings 10, 11, 12 lie sealingly against the inner wall of the tapping plunger 6 also having a longitudinal bore 31.

Furthermore, the device has a socket 1, the bayonet collar 4 and the circumferential lifting lever 7 with grip 32 and grip cover 33. The socket 1 is a hollow cylinder and possesses below a holding element 17 in the form of a thread which can be screwed into a corresponding counter thread of a keg, as well as a spiral shaped slot 3 of uniform or variable pitch. The bayonet collar 4 has a congruent slot 3' and lying opposite a slot of the same pitch or at least an upper guide edge 26 with downwardly open entrance 5, as well as inner stops 34 as rest for the bottom plate 35 of the spigot connection.

The tapping plunger upwardly has a plate 22 with a counter spigot 8 lying opposite the circumferential lifting lever (steel) 7 and, furthermore, a seat 23 for the lever 7, as well as an assembly opening 27 accessible from above for the mounting of a locking pin 36 passing through on one side. To this is connected a tubular piece with O-rings 19, 19' between which lies the transverse bore 20 for the passing on of the pressure provided via the connecting bore 15.

For the assembly, the tapping plunger 6 is first pushed into the socket 1 and thereafter the bayonet collar 4 onto the tapping plunger, whereby the counter spigot 8 passes through the entrance 5 and lies against the guiding edge 26. The slots 3, 3' are thereby repeated by the guiding edge 26 displaced by 180°. Subsequently, the circumferential lifting lever is pushed in from the outside into the plate 22 of the tapping plunger and fixed by the fixing pin 24. Thereafter grip 32 and grip cover 33 are fixed to the circumferential lifting lever 7 and immersion plunger 13 with beer pipe 2 and tap connection 28 introduced from above through the bayonet collar 4 into the tapping plunger 6. Insofar as is necessary, the parts are fixed (screwed, locked) with regard to one another. If one now moves the lever 7 along the slots 3, 3', then this makes a turning movement, i.e. it moves in circumferential direction and, at the same time, upwards or downwards, just like the counter spigot 8 along the edge 26. This edge 26 can be part of a slot analogously having an entrance with the lever movement, the tapping plunger also rotates co-axially and performs a corresponding upwards or downwards movement and, in the latter case, opens the keg valve.

Figure 2:
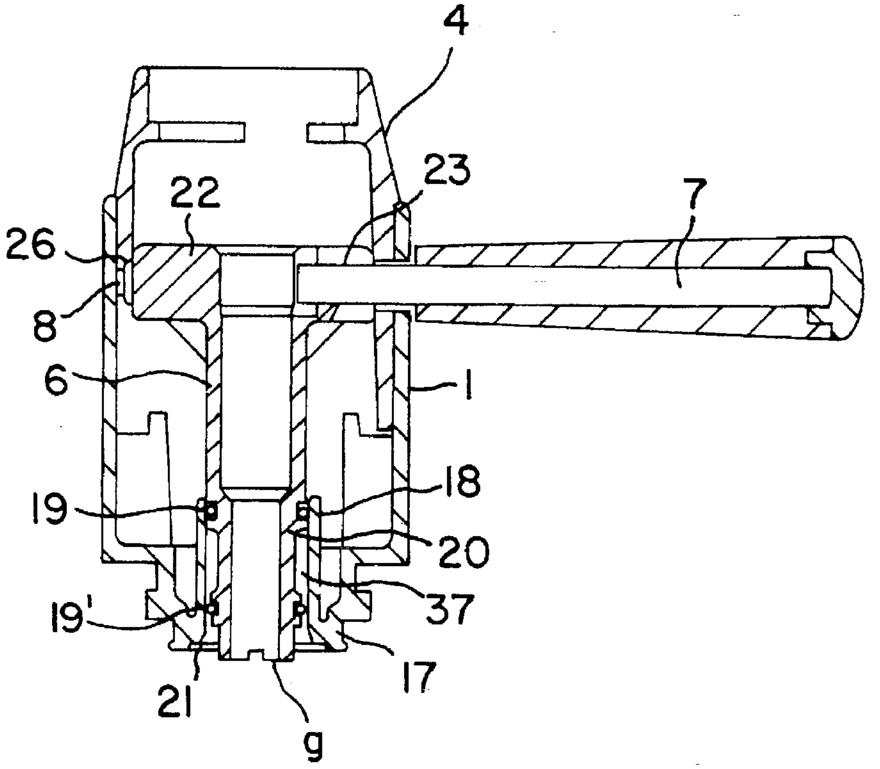
FIG. 2 shows this assembled in section

FIG. 2 shows the socket 1 with bayonet collar 4 and tapping plunger 6, in the plate 22 of which the seating 23 for the lever 7 and the seating of the counter spigot 8 against the guiding edge 26. In the bottom of the socket 1 is arranged the collar 18 in which the O-rings 19 and 19' of the tapping plunger 6 lie tightly and between which is formed a pressure chamber 37 closed off to the outside in the illustrated upper position of the tapping plunger 6.

If the tapping plunger 6 is moved downwardly, then the lower O-ring seal 19' passes into the region of the funnel-shaped widening 21 and opens the pressure chamber 37 below (whereby the keg valve is simultaneously operated) and pressure gas is able to pass out via the transverse bore 20 into the keg.

On the other hand, in the case of lifting of the tapping plunger 6, the pressure chamber 37 is closed which means that no $CO_2$ can escape from the cartridge connection in the case of changing of the keg or some other dismantling.

Figure 3:
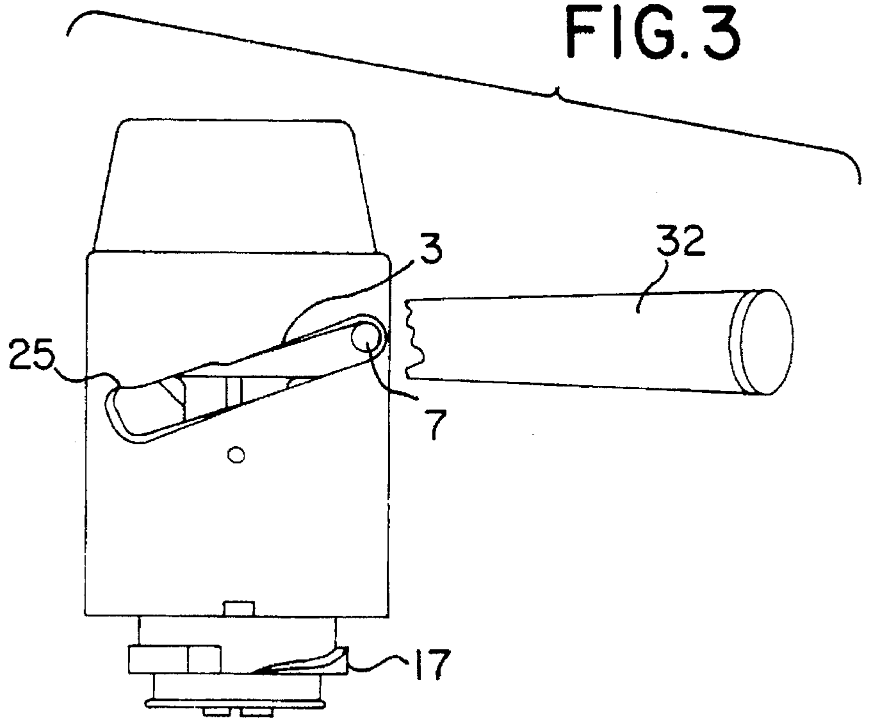
FIG. 3 shows a side view thereof.

FIG. 3 shows the outside view of the parts illustrated in FIG. 2 with the bottom thread of the socket as holding element 17 on the keg, below which a sealing ring is applied in known manner.

This slot has, from end to end, a height difference which corresponds at least to the opening path of the tapping element 9 (FIG. 2), as well as, as locking for the lever 7 in the lower position, an upwardly domed stop recess unto which the lever is pressed through the keg valve so that it cannot automatically move.

| List of references | |
|---|---|
| 1 | socket |
| 2 | beer pipe |
| 3, 3' | slot |
| 4 | bayonet collar |
| 5 | entrance |
| 6 | tapping plunger |
| 7 | circumferential lifting lever |
| 8 | counter spigot |
| 9 | tapping element |
| 10, 11, 12 | O-rings |
| 13 | immersion plunger |
| 14 | pressure chamber |
| 15 | connecting bore |
| 16 | bottom seal |
| 17 | holding element |

-continued

| List of references | |
|---|---|
| 18 | collar |
| 19, 19' | O-rings |
| 20 | transverse bore |
| 21 | widening |
| 22 | plate |
| 23 | seat |
| 24 | fixing pin |
| 25 | notch recess |
| 26 | guiding edge |
| 27 | assembly opening |
| 28 | tap connection |
| 29 | tap guide |
| 30 | pressure medium bore |
| 31 | longitudinal bore |
| 32 | grip |
| 33 | grip-cover |
| 34 | stops |
| 35 | bottom plate |
| 36 | locking pin |
| 37 | pressure chamber |

I claim:

1. A tapping device for keg taps comprising:

a socket with an upper and a lower end, the socket having a holding element for connection to a keg valve and a first spiral shaped slot;

a bayonet collar within the socket, the bayonet collar having a second spiral shaped slot which is congruent with the first slot and having a pitch that is the same as a pitch of the first slot, the bayonet collar also having a guiding edge of the same pitch as the second slot and lying opposite to the second slot, the guiding edge having an entrance open towards the lower end of the socket;

an inwardly hollow tapping plunger movably held inside the socket and the bayonet collar, the tapping plunger having a valve opening element;

a circumferential lifting lever connected to the tapping plunger and passing through the first slot and the second slot;

a counter spigot connected to a side of the tapping plunger that is opposite a connection of the lifting lever to the tapping plunger, the counter spigot being guided on the guiding edge;

an immersion plunger within the tapping plunger, the immersion plunger having three spaced O-rings and between two of the three O-rings is a connecting bore;

a beer pipe contained within the immersion plunger, the beer pipe having a bottom seal, and between the bottom seal, the immersion plunger and the beer pipe is an annular free space that constitutes a first pressure chamber; and a collar in the lower end of the socket, connected to the holding element, with the tapping plunger sealed off against the collar by a two additional O-rings to form a second pressure chamber, and between the two additional O-rings runs a transverse bore in the tapping plunger.

2. Tapping device according to claim 1, wherein the first slot and the second slot have lower top notch recesses.

3. Tapping device according to claim 2, wherein the collar has a funnel shaped widening.

4. Tapping device according to claim 2, wherein the tapping plunger has an upper plate guided on the inner wall of the bayonet collar.

5. Tapping device according to claim 2, further comprising an upper plate connected to the tapping plunger, the plate having a seat for the circumferential lever and an upper assembly opening for the mounting of a fixing pin.

6. Tapping device according to claim 1, wherein the collar has a funnel shaped widening.

7. Tapping device according to claim 6, wherein the tapping plunger has an upper plate guided on the inner wall of the bayonet collar.

8. Tapping device according to claim 6, further comprising an upper plate connected to the tapping plunger, the plate having a seat for the circumferential lever and an upper assembly opening for the mounting of a fixing pin.

9. Tapping device according to claim 1, wherein the tapping plunger has an upper plate guided on the inner wall of the bayonet collar.

10. Tapping device according to claim 9, wherein the plate has a seat for the circumferential lever and an upper assembly opening for the mounting of a fixing pin.

11. Tapping device according to claim 1, further comprising an upper plate connected to the tapping plunger, the plate having a seat for the circumferential lever and an upper assembly opening for mounting a fixing pin.

12. A tapping device according to claim 1, wherein the pitch of the first spiral shaped slot corresponds to at least a opening path of the valve-opening element such that turning the circumferential lever opens the keg valve and connects the beer pipe from a keg to a tap.

13. A tapping device according to claim 12, wherein the turning of the lever is limited to a working path of the tapping plunger.

* * * * *